Figure 1:
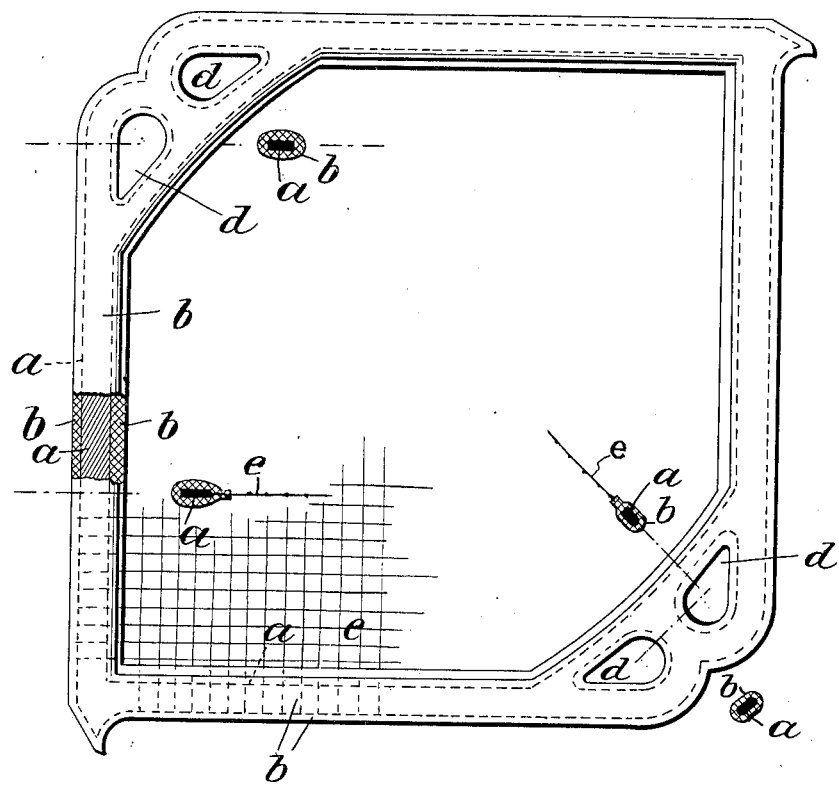

No. 887,349. PATENTED MAY 12, 1908.
C. SELLENSCHEIDT.
FILTER ELEMENT.
APPLICATION FILED JUNE 22, 1907.

2 SHEETS—SHEET 1.

Attest:

Inventor: Carl Sellenscheidt by _____ Att'ys.

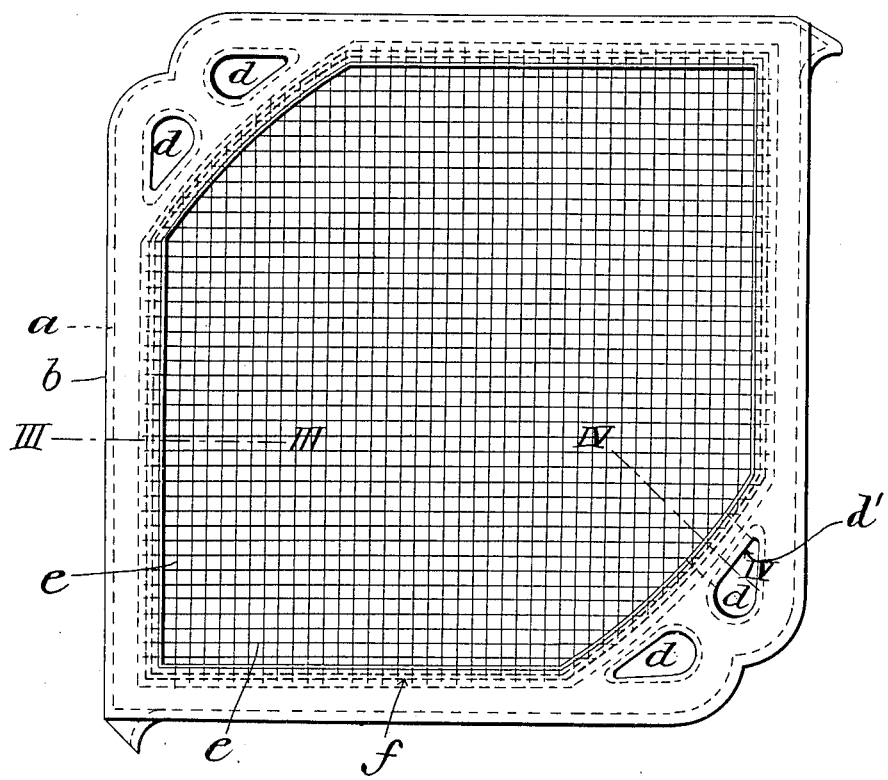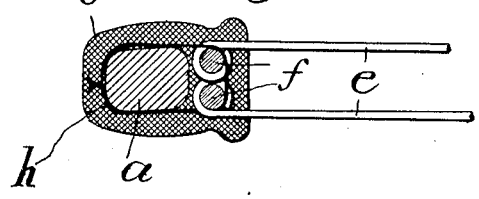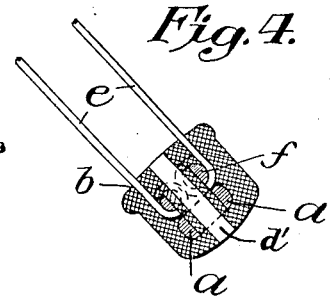

UNITED STATES PATENT OFFICE.

CARL SELLENSCHEIDT, OF BERLIN, GERMANY.

FILTER ELEMENT.

No. 887,849.     Specification of Letters Patent.     Patented May 12, 1908.

Application filed June 22, 1907. Serial No. 380,195.

*To all whom it may concern:*

Be it known that I, CARL SELLENSCHEIDT, a subject of the German Emperor, and resident of Berlin, Germany, have invented certain new and useful Improvements in Filter Elements, of which the following, taken in conjunction with the accompanying drawings, is a full, true, and concise specification.

My invention relates to filter elements for use in the well known forms of presses for filtering liquids, and especially such liquids as beer and wine, which contain carbonic acid; and the invention consists in the construction and relative arrangement of the parts of a filter element, possessing the special advantage of being both inexpensive and entirely neutral to carbonic acid, and the further advantages of not requiring special packing to prevent leakage, of increased available filtering surface, and lightness and compactness, all as will be hereinafter more fully described and especially pointed out in the accompanying claims.

Referring to the drawings which form a part of this application, Figure 1 represents a main frame of a filter element constructed in accordance with my invention, and the detail views accompanying said figures are cross-sections of the side bars of the frame at the points indicated respectively by the dotted lines; Fig. 2 is a plan view of a similar form having the filter grids formed as a separate part thereof; Fig. 3 is an enlarged cross-section on the line III—III of Fig. 2; and Fig. 4 is a similar view on lines IV—IV.

The filter element consists of a main grid-supporting frame $a$ made of metal or other suitable rigid material given an exterior contour comformable to the style of filter press with which it is to be used. In the style herein shown, the usual channel apertures $d$ are formed in the diagonally opposite corners of the frame, these being for the inlet and outlet of the liquid in a manner which will be well understood by those familiar in this art, and a network $e$ of tightly drawn wires is stretched across the frame for supporting its filtering medium.

The entire frame $a$ is incased within a covering $b$ of compressible elastic material which is neutral to carbonic acid, such, for example, as ordinary rubber. The cross sections at various places show that the metal of the frame is everywhere incased. By thus encompassing the entire surface of the frame $a$, including even the channel apertures $d$, with the rubber, it will be observed that the filtered liquid does not come into contact with the metal or other material of the frame $a$ and that while adequately rigid, it is also possible, by reason of its compressible surface, to be used in the press without employing interposed packings or other instrumentalities for making tight joints. As the rubber on the interior wall of the frame $a$ and on the two opposite sides thereof is virtually all that is employed for the above purposes, it will be seen that the rubber on the outer wall of the frame may be omitted if desired, but for obvious reasons of durability and ease of application, I prefer to incase the entire frame in the rubber, as above described.

Referring especially to Fig. 2, I exhibit a filter element of special construction with the grid or supporting framework for the filtering material formed as a separate part of the element. In this device the filtering grids consist each of an auxiliary frame $f$, from side to side of which are laid a plurality of wires $e$ in network form, as clearly indicated and under tension. The auxiliary frames $f$ fit within the main frame $a$, being parallel with each other and spaced a suitable distance apart, as shown in the drawings, and the said auxiliary frames are united to the main frame by means of wire or wire clips $h$, as indicated by the black line in Fig. 3, which when tightened serve to bind the two frames together and further stretch the wire network. The rubber covering $b$ is then molded or otherwise formed about both frames so that the marginal portions of the network grids are grasped and supported by it, the wires extending from out the rubber covering, as clearly shown in Figs. 3 and 4.

It will be seen from Fig. 4, moreover, that the liquid passage $d'$ which leads as usual from the channel aperture $d$ through the frame and into the space between the grids, is also interiorly covered or lined with the rubber, so that none of the metal of either of the frames is exposed to the liquid. Pure drawn nickel wire is preferably used for the wire of the network. Other metals, however, can also be used, as the same when in the form of drawn wire are more impervious to the liquids spoken of on account of their harder surfaces. Still other substances capable of tension, such as gut string and the like, can be used with equal effect. The stretched wire network possesses a flexibility which is highly advantageous in sustaining the pressure and shock when the liquid is passed through the filter, and has the further advantage of permitting layers of filtering material to be employed, which are made of shorter fibers than could formerly be used and therefore of less thickness, without impairing the thoroughness of the filtering process.

In the above described forms of my invention it is to be observed that the wires *e* are stretched or tautened in straight lines across the frame, forming a rectilinear lattice, each wire being under longitudinal tension, which feature adapts the grids thus formed in a most effective manner to withstand the lateral pressure of the filtering medium.

Having thus described my invention, what I claim and desire to secure by United States Letters Patent, is:—

1. A filter element comprising a frame and a grid therefor adapted to withstand the lateral pressure of the filtering material and formed of a rectilinear lattice or network of metallic wires under longitudinal tension.

2. A filter element comprising a main frame, and a grid therefor consisting of an auxiliary frame and a network of stretched wires thereon.

3. A filter element comprising a main frame and a grid therefor consisting of an auxiliary frame having a wire network thereacross and means for binding said auxiliary frame to the main frame.

4. In a filter element, a main frame and a filter grid therefor, in combination with a coating of elastic material like rubber, encompassing said frame and the marginal portion of said filter grid so as to support the latter in said main frame.

5. In a filter element, a main frame and filter grids therefor consisting of two auxiliary frames having wire network across them and a coating or casing of material like rubber completely encompassing said main and auxiliary frames.

6. In a filter element, a main rigid frame, a grid therefor consisting of an auxiliary frame adapted to fit within said main frame and having wires stretched from side to side thereof, in combination with means for binding said auxiliary frame within the main frame to further stretch said wires and a rubber covering applied over said united frames.

In testimony whereof, I have signed my name to the specification in the presence of two subscribing witnesses.

CARL SELLENSCHEIDT.

Witnesses:
HENRY HASPER,
WOLDEMAR HAUPT.